United States Patent [19]

Semanaz et al.

[11] 4,144,284

[45] Mar. 13, 1979

[54] SHAPED ARTICLES OF SYNTHETIC POLYMERS

[75] Inventors: Daniel Semanaz, Vernaison; Jany Mourlan, Lyon, both of France

[73] Assignee: Rhone-Poulenc Industries, Paris, France

[21] Appl. No.: 663,358

[22] Filed: Mar. 3, 1976

[30] Foreign Application Priority Data

Mar. 21, 1975 [FR] France ................ 75 08919

[51] Int. Cl.² .................................... C08L 77/00
[52] U.S. Cl. .................. 260/857 PA; 260/857 R; 260/857 L; 260/857 PE; 260/857 UN; 528/322
[58] Field of Search ........ 260/857 PA, 857 L, 857 R, 260/857 PE, 57 UN

[56] References Cited

U.S. PATENT DOCUMENTS

| | | | |
|---|---|---|---|
| 3,005,795 | 10/1961 | Busse | 260/857 PA |
| 3,356,759 | 12/1967 | Gerow | 260/857 PA |
| 3,712,932 | 1/1973 | Balme | 260/857 PA |
| 3,712,933 | 1/1973 | Docloux | 260/857 PA |
| 3,717,615 | 2/1973 | Holub | 260/857 PA |
| 3,766,138 | 10/1973 | Crivello | 260/857 PA |
| 3,766,302 | 10/1973 | Holub | 260/857 PA |
| 3,862,918 | 1/1975 | Laurent | 260/857 PA |
| 4,046,835 | 9/1977 | Gruffaz | 260/857 PA |
| 4,057,518 | 11/1977 | Angleraud | 260/857 PA |
| 4,064,192 | 12/1977 | Bargain | 260/857 UN |
| 4,064,193 | 12/1977 | Bargain | 260/857 UN |

*Primary Examiner*—Paul Lieberman
*Attorney, Agent, or Firm*—Stevens, Davis, Miller & Mosher

[57] ABSTRACT

A shaped article is disclosed consisting essentially of a matrix of thermoplastic polymer in which there is dispersed, in the form of particles of mean diameter less than 200μ, a polyimide resin comprising the reaction product of (a) a bis-imide of the formula:

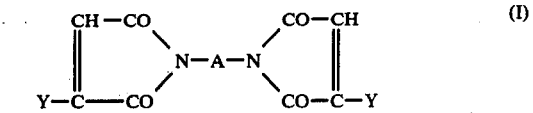

(I)

and (b) a diamine of the formula:

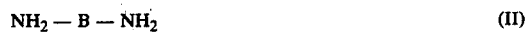

(II)

in which formulae the symbol Y represents H, CH₃ or Cl, and the symbols A and B, which may be identical or different, represent a phenylene or cyclohexylene radical or a radical

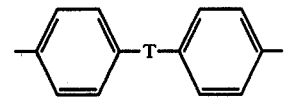

wherein T represents —CH₂—, —C(CH₃)₂—, —O—, —SO₂— or —S—, the bis-imide/diamine molar ratio being greater than 1, and the amount of polyimide resin constituting from 25 to 80% of the weight of the mixture of matrix + polyimide resin. The thermoplastic polymer may be e.g., polyethylene, polypropylene, ethylenepropylene copolymers or ethylene-tetrafluoroethylene copolymers. The shaped articles may be manufactured by injection-molding a mixture comprising the thermoplastic polymer and the polyimide resin.

4 Claims, No Drawings

SHAPED ARTICLES OF SYNTHETIC POLYMERS

The so-called "thermoplastic" polymers, such as, for example, the polyolefines, the polyamides, the polysulphones, the poly(phenylene oxides) and the poly(phenylene sulphides) can be used in numerous fields. They can be molded by various processes including, for example, the so-called injection molding technique; amongst other advantages, this technique has the advantage of making it possible to manufacture shaped articles at high cycle speeds. In certain applications involving moving parts such as, for example, transmission bearings or mechanical fitments for pumps, where the articles are in contact with other surfaces or where one of the parts travels at speeds which can be as high as from 2 to 5 m/second, the use of thermoplastic polymers is inadvisable because the friction unavoidably encountered can result in a considerable rise in temperature of the material.

In these fields of use, it is more advantageous to use thermosetting polymers, such as, for example, phenolic resins or polyimide resins, especially those obtained from bis-maleimides and diamines. The use of these latter resins for the manufacture of materials with a low coefficient of friction is described in French Pat. No. 2,029,114 (British Pat. No. 1,263,234).

The thermosetting resins can also be shaped by injection molding techniques but require special equipment because it is particularly essential that the curing of the resin should not be brought about inside the injection molding machine but rather in the mold.

The object of the present invention is to provide shaped articles which at one and the same time can be manufactured by the injection molding technique for thermoplastic polymers and, from the point of view of coefficient of friction and of wear resistance, have properties close to those of thermosetting resins.

Shaped articles according to the present invention are characterized in that they consist essentially of a matrix of thermoplastic polymer in which there is dispersed, in the form of particles of mean diameter less than 200μ, a polyimide resin comprising the reaction product of (a) a bis-imide of the formula:

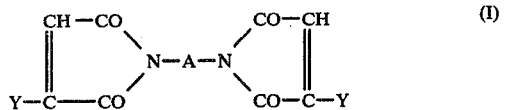

and (b) a diamine of the formula $$NH_2 - B - NH_2 \quad (II)$$

in which formulae the symbol Y represents H, CH$_3$ or Cl, and the symbols A and B, which may be identical or different, represent a phenylene or cyclohexylene radical or a radical

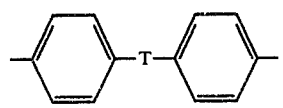

wherein T represents —CH$_2$—, —C(CH$_3$)$_2$—, —O—, —SO$_2$—, or —S—, the molar ratio of bis-imide/diamine being greater than 1, and the amount of polyimide resin constituting from 25 to 80% of the weight of the mixture of matrix + polyimide resin, and preferably from 30 to 75%.

The term "matrix" is used herein to indicate that the thermoplastic polymer constitutes the continuous phase of the shaped articles according to the invention.

The expression "thermoplastic polymer" is used in its conventional sense, that is to say it denotes a polymer which can be repeatedly softened and molded by heating and then hardened by cooling (according to Standard Specification ASTM D 883). As examples of such thermoplastic polymers there may be mentioned, for example, the homopolymers and copolymers derived from olefines or fluoroolefines; linear polyesters, such as poly(ethylene terephthalate); polymers derived from vinyl esters or vinyl chloride; polyamides obtained by polycondensation of polycarboxylic acids and polyamines or by polymerization of lactams or of aminoacids; polycarbonates; acrylonitrile-butadiene-styrene copolymers; poly(phenylene oxide); and poly(phenylene sulphide).

It is especially advantageous to use in this invention a matrix based on polyolefine, such as polyethylene, polypropylene, ethylene-propylene copolymers, or ethylene-tetrafluoroethylene copolymers.

In the preparation of the polyimide resin used in the shaped articles according to this invention, it is advantageous to use amounts of reactants such that the ratio of number of imide groups/number of —NH$_2$ groups is between 1.2 and 5.

The following may be mentioned by way of illustration of suitable bis-imides of the formula (I): N,N',4,4'-diphenylmethane-bis-maleimide; N,N',4,4'-diphenyl-ether-bis-maleimide; N,N',4,4'-diphenylsulphone-bis-maleimide; N,N',4,4'-diphenylsulphide-bis-maleimide; N,N'4,4'-(2",2"-diphenylpropane)-bis-maleimide; N,N'-para-phenylene-bis-maleimide; N,N'-meta-phenylene-bis-maleimide; and N,N',4,4'-diphenylmethane-bis-chloromaleimide.

The following may be mentioned by way of illustration of suitable diamines of the formula (II): para-phenylenediamine; meta-phenylenediamine; bis-(4-aminophenyl)-methane; bis-(4-aminophenyl) ether; bis-(4-aminophenyl)-sulphone; and bis-(4-aminophenyl)-sulphide.

It is to be understood that in accordance with techniques which are now well known, the polyimide resin can be modified by using, in addition to the bis-imide (I) and the diamine (II), various adjuvants such as, for example, monoimides (according to French Pat. No. 2,046,498); primary monoamines and/or secondary monoamines or polyamines (according to French Pat. No. 2,022,609); monomers, other than maleimides, containing polymerizable CH$_2$ = C< groups (according to British Pat. No. 1,355,401) or unsaturated polyesters (according to U.S. Pat. No. 2,712,933).

The shaped articles according to this invention may consist of only the thermoplastic matrix and the polyimide resin. They may also contain filler particles, especially so-called "self-lubricating" fillers, such as fluorinated polymers (especially polytetrafluoroethylene and tetrafluoroethylene-hexafluoropropylene copolymers), molybdenum disulphide, graphite, and lithium octoate. In general, these fillers are incorporated into the matrix in the form of a mixture with the polyimide resin. The fillers can be distinct from the resin or they can be coated with the latter. As a general rule, the size of the filler particles is of the order of 2 to 100μ and the amount of fillers may be as much as 60% of the weight of the polyimide resin.

A further aspect of the invention is a process for the manufacture of articles such as are described above. This process can be carried out in conventional injection molding machines for thermoplastics, which schematically comprise two main components:

- the screw-barrel or piston-barrel system in which the thermoplastic polymer is melted and the mixture of thermoplastic polymer, polyimide resin and, when employed, fillers, is homogenized (this system also serves to fill the mold by developing a sufficient pressure), and
- the mold where the shaping and cooling of the article take place.

In general, the thermoplastic polymer melts at a temperature of the order of 180° to 330° C. In general, the thermoplastic polymer is introduced into the melting zone in the solid form (for example as a powder, granules, small slabs or ribbon). The polyimide resin is introduced in the form of a powder, the particle size of which is preferably between 5 and 150$\mu$, and may at this stage be (from a chemical point of view) either in the form of a cross-linked cured resin or in the form of a prepolymer. In fact, reaction between the bis-imide (I) and diamine (II) is brought about by heating these reactants in a temperature range which, depending on the nature of the reactants and the period of heating, may range from 50° to 350° C.

It is advantageous to carry out the aforesaid reaction in two stages, that is to say first to prepare, if appropriate in the presence of fillers, a prepolymer which generally has a softening point of between 50° and 220° C., and then to bring about the curing of this prepolymer by heating. Thus, in the manufacture of the shaped articles according to this invention, it is possible to introduce into the injection molding machine either the cured resin or the prepolymer, the curing of the latter then taking place in the machine, within the thermoplastic polymer. Indeed, the use of this latter technique is preferred because it is easier to obtain a powder of the desired particle size in the case of the prepolymer than in the case of the cured resin.

For reasons of convenience, the mixture of the powders (thermoplastic and polyimide) is generally effected in a separate operation and the mixture then introduced into the injection molding machine.

The mold in which the articles which form the subject of this invention are shaped is generally at a temperature which makes it possible to cool the thermoplastic polymer. This temperature is thus below the melting point of the thermoplastic polymer; depending on the nature of the plastic used, this temperature can vary between about 0° and about 140° C. The presence of the polyimide resin has no effect on the shape of the mold and so the technique involved in this invention falls within the general scope of the injection molding of thermoplastic polymers, to which technique numerous works have been devoted. In particular, it is possible to employ injection pressures that are usual for thermoplastics and which, depending on the nature of the particular polymer, generally vary between 500 and 2,000 bars.

The shaped articles which form the subject of the present invention may in particular be used in fields which require that these articles should have a very low coefficient of friction and show as little wear as possible. Such requirements exist, for example, in the manufacture of transmission bearings, bearings for electrical household equipment, mechanical fitments for pumps, self-lubricating vanes for compressors with eccentric rotors, compressor segments, and the like. It is obvious that the foregoing information is given only by way of illustration of the field of application of shaped articles according to this invention and that the latter are not limited to the specific embodiments of uses that have been enumerated.

Though they contain what may seem to be a relatively large quantity of polyimide resin, the shaped articles according to this invention can be easily manufactured under the same conditions as the thermoplastic polymers themselves, and this is a considerable advantage of such articles in comparison with the injection molding of thermosetting polymers.

The examples which follow illustrate the invention still more fully. In carrying out the experiments of which these examples constitute the record, the following equipment and products were used:

The injecting molding machine is a type NB 28 automatic piston machine for Messrs. Negri Bossi. In this machine, the plunger diameter is 30 mm, the injection piston stroke is 130 mm, and the pressure applied to the material is between 1,000 and 1,200 bars.

The apparatus for the measurement of the coefficient of friction is the tribometer, the description of which is given in U.S. patent application Ser. No. 527,039 (see Belgian Pat. No. 822,666).

The polyimide prepolymer (P) is prepared by heating N,N',4,4'-diphenylmethane-bis-maleimide and bis-(4-aminophenyl)-methane (molar ratio imide/diamine = 2.5) for 15 minutes at 160° C. After cooling, the prepolymer, which has a softening point of 100° C. is ground and the powder used has a mean particle size of between 40 and 80$\mu$.

The results of the experiments represented by the examples herein are collected in the table below.

EXAMPLES 1 and 2

A mixture containing the following is prepared by simple dry mixing: $n_1$ g of an ethylene-propylene copolymer prepared from 98.5 parts of etylene per 1.5 parts of propylene, and having a melt index of 10 (according to Standard Specification ASTM D 1238 — 65T) and a mean particle size of 300$\mu$, and $n_2$ g of a mixture (M) containing, by weight, 78.5% of prepolymer (P), 1.5% of molybdenum disulphide (mean particle size of the order of 5$\mu$) and 20% of polytetrafluoroethylene (in the form of particles of mean size of the order of 5$\mu$).

The injection molding machine is fed in the conventional manner (filling hopper and metering device) and the barrel is heated to 250° C. The fused mixture is injected into the cold mold (ambient temperature: about 20°) under a pressure of 1,200 bars. Taking into account the volume of the barrel and the weight of the shaped article, the dwell time of the material in the barrel is about 10 minutes.

Small plates of size 30 mm × 18 mm × 5 mm are cut from the shaped article thus obtained and the coefficient of friction of these samples is then measured on the tribometer.

The rotating ring is made of ground and annealed steel type XC 35, of 95 Hrb Rockwell hardness. The straightness or precision is 0.3$\mu$.

Each sample is tested at three speeds (0.55 m/second, 2.2 m/second and 5.5 m/second) under a load of 12 dynes, under dry conditions, in air. The experiment normally lasts 15 minutes. If a lower duration is mentioned in the table which follows, it indicated an incident (such as excessive wear or melting) which necessitated stopping after a shorter time. The sample is weighed before and after the experiment, to determine the wear.

The temperature of the rotating ring at the instant of stopping the test is recorded.

EXAMPLES 3 and 4

The experiment of Example 1 is repeated, replacing the ethylene/propylene copolymer by polypropylene of melt index (according to Standard Specification ASTM D 1238 65T) 13.4 to 16.5 g/10 minutes. The mean particle size of this polypropylene is about 300μ.

EXAMPLE 5

The experiment of Example 1 is repeated, using only the ethylene/propylene copolymer and the prepolymer (P) (without either MoS₂ or polytetrafluoroethylene), at the rate of 30 g of copolymer per 70 g of prepolymer.

In this experiment, the determinations were only carried out at 5.5 m/second.

EXAMPLE 6

The experiment of Example 1 is repeated with 80 g of the mixture (M) and 20 g of an ethylene/tetrafluoroethylene copolymer of density 1.86 and melting point 270° C. (according to Plastiques Modernes et Elastomeres — October 1973) marketed under the trademark TEFZEL (Messrs. DU PONT DE NEMOURS).

The following modifications were made to the molding conditions:
  barrel temperature: 320° C.
  mold temperature: 80° C.
  The experiment is carried out only at 2.2 m/second.

In the following table, the "reference example" below example 2 refers to an experiment carried out using only the ethylene-propylene copolymer of examples 1 and 2 where as the "reference exemple" below example 4 refers to an experiment carried out using only the polypropylene of exemples 3 and 4.

TABLE OF RESULTS

| Ex. | Constituents (g) n₁ | n₂ | Test time (minutes) at: 0.55 m/sec. | 2.2 m/sec. | 5.5 m/sec. | Coefficient of friction at: 0.55 m/sec. | 2.2 m/sec. | 5.5 m/sec. | Sample wear (mg) wear after test at: 0.55 m/sec. | 2.2 m/sec. | 5.5 m/sec. | Temperature of the ring at the end of the experiment (° C.) 0.55 m/sec. | 2.2 m/sec. | 5.5 m/sec. |
|---|---|---|---|---|---|---|---|---|---|---|---|---|---|---|
| 1 | 30 | 70(M) | 15 | 15 | 15 | 0.18 | 0.2 ↓ →0.15 | 0.18 ↘ ↗ 0.2 0.11 | 1 | 1 | 43 | 44 | 80 | 102 |
| 2 | 50 | 50(M) | 15 | 15 | 5 | 0.25 ↓ 0.17 | 0.25 ↘ 0.1 | 0.2 ↘ ↗ 0.22 0.14 | 1 | 9 | 266 | 40 | 87 | 102 |
| Reference | 100 | 0 | 15 | 5 | 3 | 0.2 | 0.6 ↗ ↘ 0.3 | 0.45 ↘ 0.1 | 1 | 503 | 1,224 | 48 | 80 | 86 |
| 3 | 30 | 70(M) | 15 | 15 | 15 | 0.4 ↓ 0.24 | 0.35 ↓ 0.2 | 0.38 ↘ ↗ 0.3 0.15 0.2 | 14 | 49 | 204 | 48 | 94 | 124 |
| 4 | 50 | 50(M) | 15 | 15 | 5 | 0.45 ↓ 0.35 | 0.45 ↓ 0.2 | 0.4 ↓ 0.17 | 10 | 71 | 291 | 62 | 110 | 120 |
| Reference | 100 | 0 | 15 | 5 | 1 | 0.55 ↘ 0.3 | 0.9 ↗ ↘ 0.45 | 0.9 ↗ ↘ 0.55 | 15 | 556 | 739 | 54 | 100 | 48 |
| 5 | 30 | 70(P) |  | 15 |  |  |  | 0.1 |  | 39 |  |  | 84 |  |
| 6 | 20 | 80(M) |  | 15 |  | 0.35 ↗ ↘ 0.3 0.78 |  |  |  | 21 |  |  | 126 |  |

In the columns relating to the coefficient of friction, the arrows linking two figures indicate the variation (increase, stability or decrease) the coefficient of friction in the course of the experiment.
arrow not followed by a figure indicates a deterioration of the sample (melting).

What is claimed is:
1. A moulded article consisting essentially of a matrix of thermoplastic polymer selected from olefine and fluoroolefine polymers, linear polyesters, vinyl ester and vinyl chloride polymers, polycarbonates, acrylonitrile-butadiene-styrene copolymers, poly-(phenylene oxides) and poly(phenylene sulphides) in which there is dispersed, in the form of particles of mean diameter less than 200μ, a polyimide resin consisting essentially of the reaction product of (a) a bis-imide of the formula:

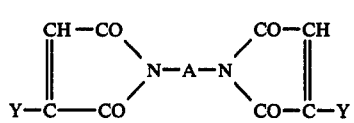

(I)

and (b) a diamine of the formula:

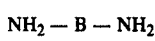

(II)

in which formulae the symbol Y represents H, CH₃ or Cl, and the symbols A and B, which may be identical or different, represent a phenylene or cyclohexylene radical or a radical

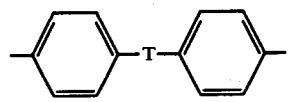

wherein T represents —CH₂, —C(CH₃)₂—, —O—, —SO₂—or —S—, the bis-imide/diamine molar ratio being greater than 1, including a polyimide resin modified by using, in addition to the bis-imide (I) and the diamine (II): a monomide; a primary monoamine; a secondary monoamine; a polyamine; a monomer, other than a maleimide, containing polymerizable CH₂ = C < groups or an unsaturated polyester; and the amount of polyimide resin constituting from 30 to 75% of the weight of the mixture of matrix + polyimide resin.

2. A shaped article according to claim 1, characterized in further comprising up to 50%, relative to the weight of the polyimide resin, of one or more fillers selected from the class consisting of particles of graphite, molybdenum disulphide, homopolymers or copolymers of tetrafluoroethylene, and lithium octoate.

3. A shaped article according to claim 1, wherein the thermoplastic polymer is a homopolymer or copolymer derived from olefines or fluoroolefines.

4. A shaped article according to claim 3, wherein the thermoplastic polymer is selected from the class consisting of polyethylene, polypropylene, ethylene-propylene copolymers and ethylene-tetrafluoroethylene copolymers.

* * * * *